C. A. Clark,
Force Pump.
N° 32,048. Patented Apr. 16, 1861.
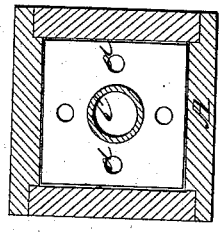
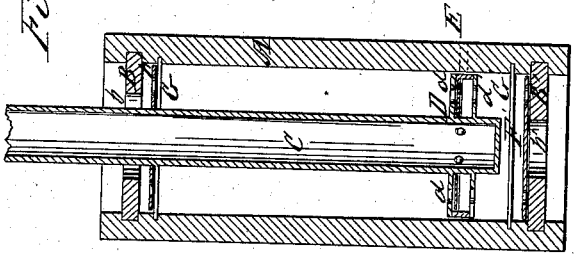
Witnesses
Octavius Knight
Inventor
C A Clark
Per Munn & Co
Attorneys

UNITED STATES PATENT OFFICE.

C. A. CLARK, OF PULASKI, IOWA.

VALVE FOR PUMPS.

Specification of Letters Patent No. 32,048, dated April 16, 1861.

*To all whom it may concern:*

Be it known that I, C. A. CLARK, of Pulaski, in the county of Davis and State of Iowa, have invented a new and Improved Force-Pump; and I do hereby declare that the following is a full, clear, and exact description of the same, reference being had to the accompanying drawing, making a part of this specification, in which—

Figure 1 is a longitudinal section of my improved pump. Fig. 2 is a transverse section of the same.

Similar letters of reference indicate corresponding parts in both figures.

This invention consists in the use of loose perforated valves confined in position within the pump cylinder, by transverse rods and operating alternately to close the ingress apertures in the respective ends of the cylinder as hereinafter explained.

A is an external casing or box, which may be of square, circular or other suitable form in its transverse section, and is provided at its respective ends with heads B B', each having a large central aperture $b$, $b'$, as shown in Fig. 1.

C is a hollow piston rod closed at its lower or inner end and provided near that end with radial apertures $c$, communicating with the interior of a hollow piston D. Both plates of the said piston are perforated as shown at $d$ and $d'$.

E, is an annular valve inclosed within the piston D, and covering the apertures $d$, and $d'$, alternately as hereinafter explained.

F, and F', are valves fitting loosely within the case A, and perforated near their edges as represented.

G, G', are rods fixed transversely within the case A, to hold the valves F, and F', in proximity with their seats. The case A, is intended to be entirely immersed, and in position may be either vertical, horizontal, or inclined.

In Fig. 1, the piston is represented as approaching the termination of its downward or inward stroke. The blue arrows indicate the course of the water.

The pressure of the water forces the valve F', against the head B', thus preventing the escape of water in that direction. The confined water rushes through the apertures $d'$, and $c$, into the hollow rod C, and through this to the place of discharge. The pressure of the atmosphere carries water through the apertures in the head B, and valve F, so as to completely fill the chamber above or behind the receding piston. In the return stroke of the piston the valve F, is forced against the head B, so as to close the apertures therein and the water rushing into the hollow piston through the apertures $d$, forces the valve E down upon the apertures $d'$, and passes through the apertures $c$, and thence out through the rod C, as before explained.

This invention is applicable to force pumps of various descriptions including those used in fire engines.

Having thus described my invention, what I claim as new and desire to secure by Letters Patent; is,

The loose perforated valves F, F', operating in connection with the apertures $b$, $b'$, and rods G, G', as and for the purposes set forth.

C. A. CLARK.

Witnesses:
   A. B. MYERS,
   H. M. WYETH.